(12) United States Patent
Zhang et al.

(10) Patent No.: US 11,382,096 B2
(45) Date of Patent: Jul. 5, 2022

(54) METHOD AND DEVICE FOR SIGNAL TRANSMISSION BASED ON A RELATIONSHIP BETWEEN A FIRST SIGNAL AND A SECOND SIGNAL

(71) Applicant: ZTE Corporation, Guangdong (CN)

(72) Inventors: Shujuan Zhang, Shenzhen (CN); Yuxin Wang, Shenzhen (CN); Zhaohua Lu, Shenzhen (CN); YuNgok Li, Shenzhen (CN); Yijian Chen, Shenzhen (CN); Bo Gao, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 159 days.

(21) Appl. No.: 16/833,591

(22) Filed: Mar. 28, 2020

(65) Prior Publication Data
US 2020/0229185 A1 Jul. 16, 2020

Related U.S. Application Data

(63) Continuation of application No. PCT/CN2018/108845, filed on Sep. 29, 2018.

(30) Foreign Application Priority Data

Sep. 30, 2017 (CN) .......................... 201710939914.8

(51) Int. Cl.
*H04W 72/04* (2009.01)

(52) U.S. Cl.
CPC ..... *H04W 72/0446* (2013.01); *H04W 72/042* (2013.01)

(58) Field of Classification Search
CPC ........... H04W 72/0446; H04W 72/042; H04W 72/085; H04L 5/0053; H04L 5/0048; H04L 5/0025; H04B 7/0695; H04B 7/024
See application file for complete search history.

(56) References Cited

U.S. PATENT DOCUMENTS

| | | | | |
|---|---|---|---|---|
| 10,863,494 | B2 * | 12/2020 | Zhang | H04L 5/005 |
| 2013/0294318 | A1 * | 11/2013 | Amerga | H04W 4/06 |
| | | | | 370/312 |
| 2020/0007292 | A1 * | 1/2020 | Huang | H04L 5/0094 |

FOREIGN PATENT DOCUMENTS

| | | |
|---|---|---|
| CN | 102244557 A | 11/2011 |
| CN | 103402251 A | 11/2013 |
| CN | 108093480 A | 5/2018 |

OTHER PUBLICATIONS

Ericsson: "UCI on sPUSCH with short TTI", 3GPP TSG-RAN WG1 Meeting #90bis, R1-1717166, Sep. 29, 2017 (Sep. 29, 2017), pp. 1-5.

(Continued)

*Primary Examiner* — Wei Zhao
(74) *Attorney, Agent, or Firm* — Cantor Colburn LLP

(57) ABSTRACT

Disclosed are a method and a device for signal transmission. The method includes: determining a transmission mode of a first signal according to at least one of the following: relationship information between a first spatial filtering parameter and a second spatial filtering parameter; a third reference signal associated with the second signal; relationship information between a first reference signal and a second reference signal; relationship information between DCIs corresponding to the first and the second signals; whether a time interval between the first and second signals being greater than predetermined threshold; information type of information in the first signal; time delay information required for switching the spatial filtering parameters; a configuration information indicating whether the first signal and the second signal share one spatial filtering parameter; and sending or receiving the first signal using the determined transmission mode.

20 Claims, 6 Drawing Sheets

(56) References Cited

OTHER PUBLICATIONS

Nokia: "UCI on sPUSCH", 3GPP TSG-RAN WG1 Meeting #90bis, R1-1717237, Sep. 29, 2017 (Sep. 29, 2017), pp. 1 and 2.
International Search Report for corresponding application PCT/CN2018/108845 filed Sep. 29, 2018; dated Dec. 29, 2018.

* cited by examiner

METHOD AND DEVICE FOR SIGNAL TRANSMISSION BASED ON A RELATIONSHIP BETWEEN A FIRST SIGNAL AND A SECOND SIGNAL

CROSS REFERENCE TO RELATED APPLICATION

The present application is a continuation of International Application No. PCT/CN2018/108845, filed on Sep. 29, 2018, which is based on and claims priority to Chinese patent Application No. 201710939914.8, filed on Sep. 30, 2017, which are hereby incorporated by reference in their entirety.

FIELD

The present application relates to but not limited to communication technologies, and more particularly, to a method and device for signal transmission.

BACKGROUND

New Radio (NR) is now under discussion. One of important scenarios for NR is high-frequency-based beam transmission technologies, especially beam transmission technologies based on radio frequency. Due to high directional property, problems would occur when beams of two ends are not aligned. For example, in some situations, a base station may not receive a signal sent by a terminal using a beam, which would result in communication failure.

SUMMARY

Embodiments of the present application provide a method and device for signal transmission.

The present application provides the following schemes.

A method for signal transmission, includes:

determining a transmission mode of a first signal according to at least one of the following:

a relationship information between a first spatial filtering parameter of a first signal and a second spatial filtering parameter of a second signal;

a third reference signal associated with the second signal;

a relationship information between a first reference signal associated with the first signal and a second reference signal associated with the second signal;

a relationship information between a peer end indication information corresponding to the first signal and a peer end indication information corresponding to the second signal;

whether a time interval between the first signal and the second signal being greater than a predetermined threshold information;

an information type of the information in the first signal;

a time delay information required for switching the first spatial filtering parameter of the first signal and the second spatial filtering parameter of the second signal;

a time delay information required for switching the spatial filtering parameters;

a configuration information indicating whether the first signal and the second signal share one spatial filtering parameter;

a configuration information for the first signal and/or the second signal;

conducting a transmission for the first signal using the determined transmission mode.

A device for signal transmission, includes:

a determination module; and a transmission module;

wherein the determination module is configured to determine a transmission mode of a first signal according to at least one of the following:

a relationship information between a first spatial filtering parameter of a first signal and a second spatial filtering parameter of a second signal;

a third reference signal associated with the second signal;

a relationship information between a first reference signal associated with the first signal and a second reference signal associated with the second signal;

a relationship information between a peer end indication information corresponding to the first signal and a peer end indication information corresponding to the second signal;

whether a time interval between the first signal and the second signal being greater than a predetermined threshold information;

an information type of the information in the first signal;

a time delay information required for switching the first spatial filtering parameter of the first signal and the second spatial filtering parameter of the second signal;

a time delay information required for switching the spatial filtering parameters;

a configuration information indicating whether the first signal and the second signal share one spatial filtering parameter;

a configuration information of the first signal and/or the second signal;

wherein the transmission module is configured to conduct a transmission for the first signal using the determined transmission mode.

A device for signal transmission, includes:

a storage for storing a signal transmission program;

a processor, configured to read the signal transmission program to perform the method for signal transmission as described above.

A computer readable medium, which is stored with a signal transmission program, the method for signal transmission as described above is implemented when the signal transmission program is performed by a processor.

In the embodiments of the present application, the transmission mode is determined through one or more of the following: the relationship information between the first spatial filtering parameter of the first signal and the second spatial filtering parameter of the second signal, the reference signal associated with the second signal, the relationship information between the first reference signal associated with the first signal and the second reference signal associated with the second signal, the relationship information between the peer end indication information corresponding to the first signal and the peer end indication information corresponding to the second signal, whether the time interval between the first and the second signals being greater than the predetermined threshold information, the information type of the information in the first signal, the time delay information required for switching the first spatial filtering parameter of the first signal and the second spatial filtering parameter of the second signal, the time delay information required for switching the spatial filtering parameters, the configuration information indicating whether the first and the second signals share one spatial filtering parameter, and the configuration information of the first signal and/or the second signal; and then the first signal is subjected to transmission using the determined transmission mode. In this manner, the beam coordination question between the base station and the terminal can be solved when a first uplink signal and a second uplink signal are to be transmitted simultaneously in a time slot. Then, it is ensured that understandings of beams for both base station and the terminal are consistent, and finally the signals can successfully reach the peer end.

BRIEF DESCRIPTION OF THE DRAWINGS

The drawings are used to provide a further understanding of the technical solution of the application, and form a part of the specification. The drawings, together with the embodiments of the application, are used to explain the technical solution of the application and do not constitute a limitation of the technical solution of the application.

DETAILED DESCRIPTION

In order to make the purpose, technical scheme and advantages of the application clearer, the following will give a detailed description of the embodiments of the application in combination with the accompanying drawings. It should be noted that the embodiments in the application and the features in the embodiments can be combined with each other without conflict.

The steps illustrated in the flowchart of the drawings may be performed in a computer system such as a set of computer executable instructions. And although the logical order is shown in the flowchart, in some cases the steps shown or described can be performed in a different order than indicated herein.

Figure 1:
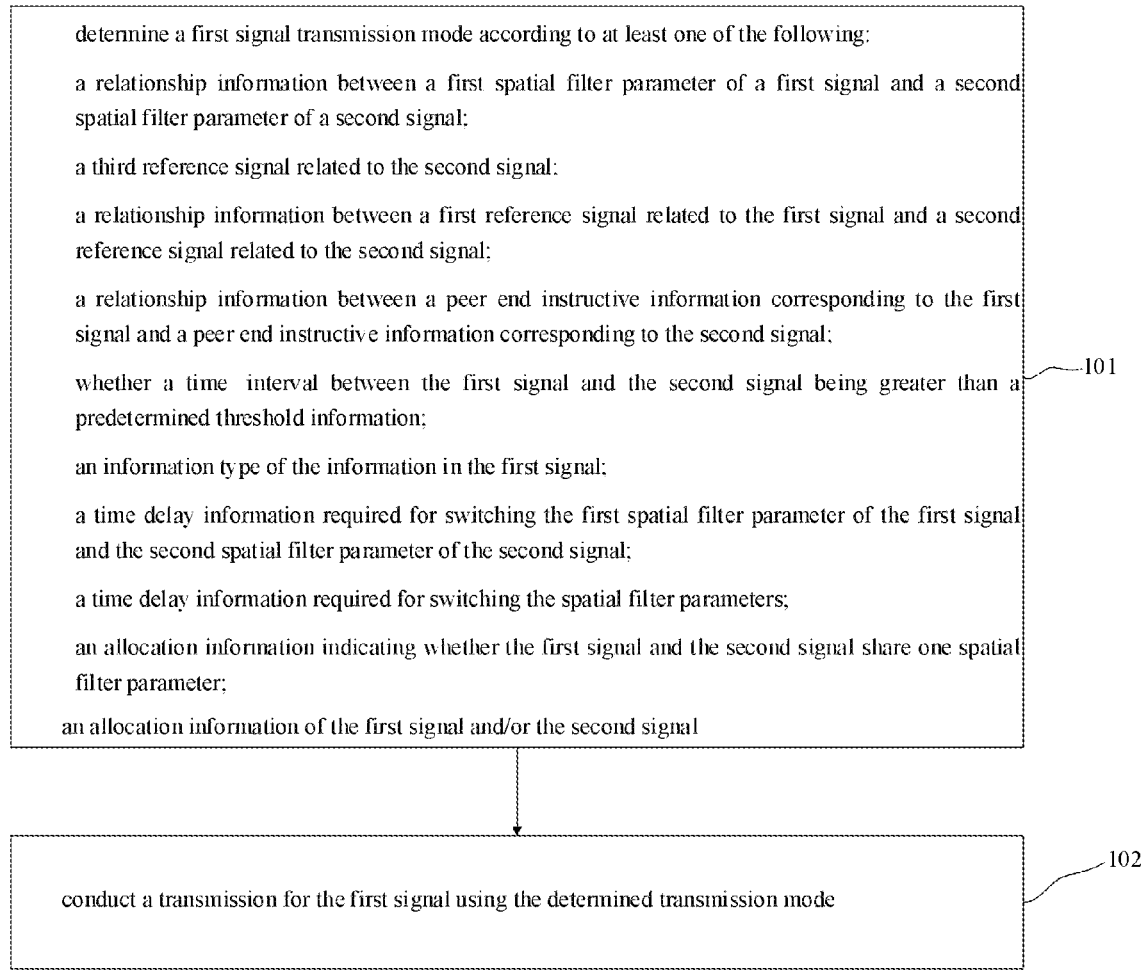
FIG. 1 is a schematic flowchart illustrating the method for signal transmission in an embodiment of the present application.

It has been found in many researches that beam coordination question needs to be considered when a first uplink signal and a second uplink signal are to be transmitted simultaneously in a time slot. If the beam coordination question is neglected and the multiplexing and rate matching information of the two signals are determined directly, the signal cannot reach the receiving end due to inconsistent understanding of the beam between the base station and a terminal. For example, if a transmitting beam of a Physical Uplink Shared Channel (PUSCH) and a transmitting beam of a Physical Uplink Control Channel (PUCCH) are inconsistent, the base station and the terminal have agreed that, when the PUCCH and the PUSCH are transmitted in the same slot, control information contained in the PUCCH is required to be put into the PUSCH for transmission, and the transmitting beam of the PUSCH is adopted uniformly to transmit data and control information contained in the PUCCH channel through the PUSCH channel. However, since the terminal have not received the scheduling information, the terminal would continuously use the original transmitting beam for transmitting signals on PUCCH, but the base station has adjusted its receiving beam to align the transmitting beam of the PUSCH, this would cause the uplink signal transmitted by the terminal through PUCCH unable to be received by the base station. Further, the beam coordination question needs to be considered when a first uplink signal and a second uplink signal are to be transmitted simultaneously in a time slot. If the beam coordination question is neglected and the multiplexing and rate matching information of the two signals are determined directly, the signal cannot reach the receiving end due to the inconsistent understanding of the beam between the base station and the terminal. Accordingly, an embodiment of the present application provides a method for signal transmission, as shown in FIG. 1. The method includes the following steps.

Step 101: determine a transmission mode of a first signal according to at least one of the following: a relationship information between a first spatial filtering parameter of a first signal and a second spatial filtering parameter of a second signal; a third reference signal associated with the second signal; a relationship information between a first reference signal associated with the first signal and a second reference signal associated with the second signal; a relationship information between a peer end indication information corresponding to the first signal and a peer end indication information corresponding to the second signal; whether a time interval between the first signal and the second signal being greater than a predetermined threshold information; an information type of the information in the first signal; a time delay information required for switching the first spatial filtering parameter of the first signal and the second spatial filtering parameter of the second signal; a time delay information required for switching the spatial filtering parameters; a configuration information indicating whether the first signal and the second signal share one spatial filtering parameter; and a configuration information of the first signal and/or the second signal;

Step 102: conduct a transmission for the first signal using the determined transmission mode.

In the present embodiment, a transmission mode of a first signal is determined through one or more of the following: a relationship information between a first spatial filtering parameter of a first signal and a second spatial filtering parameter of a second signal, a third reference signal associated with the second signal, a relationship information between a first reference signal associated with the first signal and a second reference signal associated with the second signal, a relationship information between a peer end indication information corresponding to the first signal and a peer end indication information corresponding to the second signal, whether a time interval between the first signal and the second signal being greater than a predetermined threshold information, an information type of the information in the first signal, a time delay information required for switching the first spatial filtering parameter of the first signal and the second spatial filtering parameter of the second signal, a time delay information required for switching the spatial filtering parameters, a configuration information indicating whether the first signal and the second signal share one spatial filtering parameter, a configuration information of the first signal and/or the second signal, and then the first signal is transmitted through the determined transmission mode. In this manner, when the first and second uplink signals are to be transmitted simultaneously in a same time slot, the beam coordination question between the terminal and the base station can be solved. Then, it can be assured that both the base station and the terminal comprehend the beams consistently, so that the receiving end can receive wireless signal transmitted by a transmitting end using corresponding beams, and the signal can finally reach the receiving end.

In the present embodiment, when the transmission signal is a transmitting signal, the peer end is a receiving end for the signal. When the transmission signal is a receiving signal, the peer end is a transmitting end for the signal.

In the present embodiment, switching time delay for different pairs of spatial filtering parameters may be different. The switching spatial filtering parameter herein is a minimum value among the multiple switching time delays. For example, each of the multiple switching time delays corresponds to a switching time delay for a set of pairs of the spatial filtering parameters.

In the present embodiment, the transmission may include sending or receiving. The transmission direction may include uplink or downlink; alternatively, the transmission direction may include a direction for sending signal and/or a direction for receiving signal.

In the present embodiment, the spatial filtering parameter may be referred to as beam parameter or pre-coding parameter.

In the present embodiment, the first signal and the second signal satisfy at least one of the following: a transmission direction of the first signal being the same as a transmission direction of the second signal; the first signal and the second signal being transmitted within a time unit; a control signaling for triggering a transmission of the first signal being prior to a control signaling for triggering a transmission of the second signal; an information of the first signal being obtained through a high level signaling; an information of the second signal being obtained through a physical layer dynamic control signaling; the first signal being triggered by the high level signaling; the second signal being triggered by the physical layer dynamic control signaling; a priority of the first signal being higher than a priority of the second signal.

The first signal herein may include at least one of the following: data signal, control signal, reference signal, random access signal, and resource request signal. The second signal may include at least one of the following: data signal, control signal, reference signal, random access signal, and resource request signal. For example, the first signal may be a data signal and the second signal may be a control signal. Alternatively, the first signal may be a first control signal and the second signal may be a second control signal.

In the present embodiment, the determined transmission mode satisfies at least one of the following: the first spatial filtering parameter being changed according to the second spatial filtering parameter; the first spatial filtering parameter not being changed according to the second spatial filtering parameter; a resource of the first signal being changed according to a resource occupied by the second signal; a resource of the first signal not being changed according to a resource occupied by the second signal; a resource utilizable by the first signal being changed according to a resource occupied by the second signal; a resource utilizable by the first signal not being changed according to resource occupied by the second signal; a channel where the first signal is located being adjusted according to a channel where the second signal is located; a channel where the first signal is located not being adjusted according to a channel where the second signal is located; a demodulation reference signal parameter of the first signal being changed according to a parameter of the second signal; a demodulation reference signal parameter of the first signal not being changed according to a parameter of the second signal; the first signal relating to the second reference signal; the first signal not relating to the second signal.

The resource as mentioned above include at least one of the following resources: time domain resource, frequency domain resource, code domain resource, spatial domain resource.

In the present embodiment, the determined signal transmission mode corresponds to the multiplexing mode of the first signal and the second signal.

In the present embodiment, the relationship information between the first spatial filtering parameter of the first signal and the second spatial filtering parameter of the second signal includes one or more of the following information: whether the first spatial filtering parameter and the second spatial filtering parameter belonging to a same set of spatial filtering parameter; whether the first spatial filtering parameter and the second spatial filtering parameter being the same; whether the first spatial filtering parameter and the second spatial filtering parameter being generated at the same time.

When the first reference signal and the second reference signal belong to a same set, the first spatial filtering parameter and the second spatial filtering parameter belong to the same set of spatial filtering parameter. When the first reference signal and the second reference signal belong to different sets, the first spatial filtering parameter and the second spatial filtering parameter belong to different sets of spatial filtering parameters. Further, the first reference signal relates to the first signal, and the second reference signal relates to the second signal.

The spatial filtering parameter of the first signal can be obtained according to the spatial filtering parameter of the first reference signal, and the spatial filtering parameter of the second signal can be obtained according to the spatial filtering parameter of the second reference signal.

In the present embodiment, the spatial filtering parameter information of the first signal and/or the channel character parameter of the first signal can be obtained according to the reference signal associated with the second signal.

In the present embodiment, the spatial filtering parameter information of the first signal and/or the channel character parameter of the first signal can be obtained according to the relationship information between the first reference signal associated with the first signal and the second reference signal associated with the second signal.

In the present embodiment, the relationship information between the first reference signal and the second reference signal includes at least one of the following: whether the first reference signal and the second reference signal belonging to a same set of spatial filtering parameter; whether the first reference signal and the reference signal being the same; whether the first reference signal and the second reference signal being able to be transmitted simultaneously.

In the present embodiment, the method may further include: transmitting a first signaling information including a group information of the reference signal; and/or receiving a second signaling information including a group information of the reference signal. Here, a group of the first signaling information is a subset of a group of the second signaling information, or a group of the second signaling information is a subset of a group of the first signaling information.

In the present embodiment, the configuration information for the first signal and/or the second signal may include at least one of the following information: an information of a predetermine multiplexing between the first signal and the second signal; an information indicating whether the spatial filtering parameter of the first signal being changed according to the spatial filtering parameter of the second signal; an information indicating whether the resource of the first signal being changed according to the resource occupied by the second signal; an information indicating whether the resource utilizable by the first signal being changed according to the resource occupied by the second signal; an information indicating whether the demodulation reference signal parameter of the first signal being changed according to the demodulation reference signal parameter of the second signal.

Herein, the resource includes time domain resource, frequency domain resource, code domain resource and spatial domain resource.

In the present embodiment, the multiplexing mode or the predetermined multiplexing mode between the first signal and the second signal include at least one of the following: the first signal and the second signal being transmitted on a channel where the second signal is located; the first signal being transmitted on a channel where the first signal is located, and the second signal being transmitted on a channel where the second signal is located; the first signal being transmitted on a channel where the first signal is located, and also being transmitted on a channel where the second signal is located; the first signal and the second signal being time division multiplexed; the first signal and the second signal being frequency division multiplexed; the first signal and the second signal being code division multiplexed; the first signal and the second signal being time division multiplexed and a time interval between the first signal and the second signal being not greater than a first predetermined threshold; the first signal and the second signal being time division multiplexed and a time interval between the first signal and the second signal being not smaller than a second predetermined threshold; the first signal and the second signal sharing one cyclic redundancy check (CRC) information; each of the first signal and the second signal has its own independent CRC information; information of the first signal and information of the second signal being placed in an information block before channel coding for joint channel coding; information of the first signal and information of the second signal being placed in two independent information blocks before channel coding for independent channel coding.

In the present embodiment, the resource of the first signal being changed according to the resource occupied by the second signal satisfies at least one of the following: the first signal not occupying a time domain resource in a predetermined time window before the second signal being transmitted; an information of the first signal falling in a time domain resource of a predetermined time window before the second signal being transmitted being punched, no transmission; here, an information of the first signal falling in a time domain resource of a predetermined time window before the second signal being transmitted being punched means that the responding information is shielded from transmission; the first signal not occupying a time domain resource in a predetermined time window after the second signal being transmitted; an information of the first signal falling in a time domain resource of a predetermined time window after the second signal being transmitted being punched, no transmission; here, an information of the first signal falling in a time domain resource of a predetermined time window after the second signal being transmitted being punched means that the responding information is shielded from transmission; abandoning the first signal.

In the present embodiment, the resource utilizable by the first signal being changed according to the resource occupied by the second signal satisfies at least one of the following: determining a time-domain symbol range that can be occupied by an initial position of the first signal according to the resource occupied by the second signal; determining a time-domain symbol range that can be occupied by an ending position of the first signal according to the resource occupied by the second signal.

When the first signal of the present embodiment includes a control information, an information type includes at least one of the following types: a request of beam failure; a confirmation information for indicating whether the third signal is successfully transmitted, herein the transmission directions of the first signal and the third signal are different; a feedback information for a status of a control channel.

In the present embodiment, conducting a transmission for the first signal using the determined transmission mode may include: when the first signal includes the request of beam failure, adopting a first transmission mode to conduct a transmission for the first signal and the second signal; when the first signal does not include the request of beam failure, adopting a second transmission mode to conduct a transmission for the first signal and the second signal.

In the present embodiment, the determined transmission mode satisfies at least one of the following: when the first signal includes the request of beam failure, the first signal not being transmitted on a channel where the second signal is located; when the first signal includes the request of beam failure, the first signal and the second signal being transmitted via each independent channel; when the first signal includes the request of beam failure, the first spatial filtering parameter of the first signal not being changed according to the second spatial filtering parameter of the second signal;

when the first signal includes the request of beam failure, abandoning the second signal.

In the present embodiment, the relationship information between the peer end indication information corresponding to the first signal and the peer end indication information corresponding to the second signal includes at least one of the following: whether the peer end indication information corresponding to the first signal and the peer end indication information corresponding to the second signal belong to a same set of peer end indication information; whether the peer end indication information corresponding to the first signal and the peer end indication information corresponding to the second signal are the same.

In the present embodiment, the determined transmission mode satisfies one of the following: when the first spatial filtering parameter and the second spatial filtering parameter are different, the time interval between transmitting the first signal and the second signal being not smaller than a minimum time interval information for switching the spatial filtering parameters.

In the present embodiment, the spatial filtering parameters are obtained through at least one of the following: the spatial filtering parameter used when transmitting the reference signal; the spatial filtering parameter used when receiving the reference signal; a channel character parameter of the reference signal satisfying a quasi-co-location QCL relationship; a precoding weight value information; herein the reference signal and the signals are related, or the reference signal and the demodulation reference signals of the signals are related, and the signals include the first signal and the second signal.

The spatial filtering parameter may refer to the first spatial filtering parameter, the second spatial filtering parameter and etc as describe above.

In the present embodiment, the first transmission mode being determined when a switching time delay between the first spatial filtering parameter and the second spatial filtering parameter being smaller than a transmission time interval between the first signal and the second signal, or a second transmission mode being determined when a switching time delay between the first spatial filtering parameter of the first signal and the second spatial filtering parameter of the second signal being greater than a transmission time interval between the first signal and the second signal; or the first transmission mode being determined when a minimum time delay for switching the spatial filtering parameters being smaller than a transmission time interval between the first signal and the second signal, or a second transmission mode being determined when a minimum time delay for switching the spatial filtering parameters being greater than a transmission time interval between the first signal and the second signal.

In the present embodiment, the step of the channel where the first signal is located being adjusted according to a channel where the second signal is located includes: the channel where the first signal is located is adjusted to the channel where the second signal is located; the channel where the first signal is located is adjusted to two channels consisted of one channel where the first signal is located and the other one where the second signal is located.

In the present embodiment, determining the transmission mode of the first signal according to whether the time interval between the first signal and the second signal being greater than the predetermined threshold information may include: when the time interval between the first signal and the second signal is greater than the predetermined threshold, the first transmission mode is adopted; when the time interval between the first signal and the second signal is not greater than the predetermined threshold, a second transmission mode is adopted.

In the present embodiment, determining the transmission mode of the first signal according to the configuration information indicating whether the first signal and the second signal share one spatial filtering parameter may include: when the first signal and the second signal share the same spatial filtering parameter in the configuration information, the first transmission mode is adopted; when the first signal and the second signal each has its own independent spatial filtering parameter in the configuration information, a second transmission mode is adopted.

In the present embodiment, the method for signal transmission further includes: transmitting a signaling information before transmitting the first signal, herein the signaling information includes at least one of the following: a time delay required for switching the first spatial filtering parameter and the second spatial filtering parameter; a minimum value of time delays for switching all of pairs of the spatial filtering parameters; a minimum time delay required for switching the first reference signal and the second reference signal.

Figure 2:
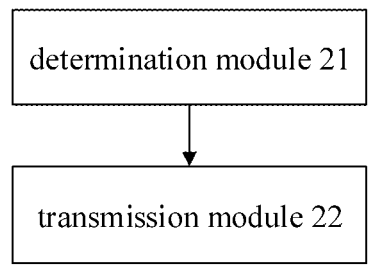
FIG. 2 is a structural schematic view illustrating the device for signal transmission in an embodiment of the present application.

A device for signal transmission is also provided in the present embodiment. The device is shown in FIG. 2. The device includes a determination module 21 and a transmission module 22.

The determination module 21 is configured to determine a transmission mode of a first signal according to at least one of the following: a relationship information between a first spatial filtering parameter of a first signal and a second spatial filtering parameter of a second signal; a third reference signal associated with the second signal; a relationship information between a first reference signal associated with the first signal and a second reference signal associated with the second signal; a relationship information between a peer end indication information corresponding to the first signal and a peer end indication information corresponding to the second signal; whether a time interval between the first signal and the second signal being greater than a predetermined threshold information; an information type of the information in the first signal; a time delay information required for switching the first spatial filtering parameter of the first signal and the second spatial filtering parameter of the second signal; a time delay information required for switching the spatial filtering parameters; a configuration information indicating whether the first signal and the second signal share one spatial filtering parameter; a configuration information of the first signal and/or the second signal. The transmission module 22 is configured to transmit the first signal using the determined transmission mode.

In the present embodiment, the transmission mode of the first signal determined by the determination module 21 satisfies at least one of the following: the first spatial filtering parameter being changed according to the second spatial filtering parameter; the first spatial filtering parameter not being changed according to the second spatial filtering parameter; a resource of the first signal being changed according to a resource occupied by the second signal; a resource of the first signal not being changed according to a resource occupied by the second signal; a resource utilizable by the first signal being changed according to a resource occupied by the second signal; a resource utilizable by the first signal not being changed according to a resource occupied by the second signal; a channel where the first signal is located being adjusted according to a channel where the second signal is located; a channel where the first signal is located not being adjusted according to a channel where the second signal is located; a demodulation reference signal parameter of the first signal being changed according to a parameter of the second signal; a demodulation reference signal parameter of the first signal not being changed according to a parameter of the second signal.

In the present embodiment, the relationship information between the first spatial filtering parameter of the first signal and the second spatial filtering parameter of the second signal includes one or more of the following information: whether the first spatial filtering parameter and the second spatial filtering parameter belonging to a same set of spatial filtering parameter; whether the first spatial filtering parameter and the second spatial filtering parameter being the same; whether the first spatial filtering parameter and the second spatial filtering parameter being generated at the same time.

In the present embodiment, the transmission module 22 being configured to transmit the first signal using the determined transmission mode includes: when the first signal includes the request of beam failure, adopting a first transmission mode to transmit the first signal and the second signal; when the first signal does not include the request of beam failure, adopting a second transmission mode to transmit the first signal and the second signal. In the present embodiment, the determination module 21 configured to determine the transmission mode of the first signal according to whether the time interval between the first signal and the second signal being greater than the predetermined threshold information includes: when the time interval between the first signal and the second signal is greater than the predetermined threshold, the first transmission mode is adopted; when the time interval between the first signal and the second signal is not greater than the predetermined threshold, the second transmission mode is adopted.

In the present embodiment, the determination module 21 is configured to determine the transmission mode of the first signal according to the configuration information indicating whether the first signal and the second signal share one spatial filtering parameter, which includes: when the first signal and the second signal share the same spatial filtering parameter in the configuration information, the first transmission mode is adopted; when the first signal and the second signal each has its own independent spatial filtering parameter in its configuration information, a second transmission mode is adopted.

In the present embodiment, the determination module 21 and the transmission module 22 may be software, hardware, or the combination of both. For example, the transmission module 21 may be implemented through a radio frequency module in a base station or a terminal, and the determination module 21 may be implemented through a processor in a base station or a terminal. In addition, the determination module 21 and the transmission module 22 may be implemented through other manners.

The present application further provides a device for signal transmission. The device includes a storage for storing a signal transmission program, and a processor configured to read the signal transmission program to perform the method for signal transmission as described in any previous embodiment.

The device for signal transmission as described in the previous embodiments may be disposed in a base station or a terminal. In particle application, the device for signal transmission may be implemented through a radio frequency circuit in a base station and/or a terminal.

In some embodiment, the device for signal transmission may further include an antenna. The antenna connects with the processor, and is configured for transmitting wireless signals for the device. The wireless signals may include the first signal or the second signal.

The processor may include a central processor, a microprocessor, a digital signal processor, a digital signal processor or a programmable array.

The processor may connect with the processor, the storage and the antenna through a bus for integrated circuit (IC) or through a bus for peripheral equipment.

The present embodiment provides a computer readable medium. The computer readable medium stores a signal transmission program, the method for signal transmission of any of the embodiments as described above is implemented when the signal transmission program is performed by a processor.

In the present embodiment, a terminal performs the following steps: step one, determining a relationship between a first spatial filtering parameter of a first signal and a second spatial filtering parameter of a second signal; step two, determining a third spatial filtering parameter of the first signal according to the relationship; and step three, conducting a transmission for the first signal using the determined third spatial filtering parameter.

In some embodiments, determining the third spatial filtering parameter of the first signal according to the relationship includes: determining the third spatial filtering parameter based on whether the first spatial filtering parameter of the first signal and the second spatial filtering parameter of the second signal belonging to a same set of spatial filtering parameter; and/or determining the third spatial filtering parameter based on whether the first spatial filtering parameter of the first signal and the second spatial filtering parameter of the second signal being generated by the terminal at the same time.

Figure 3:
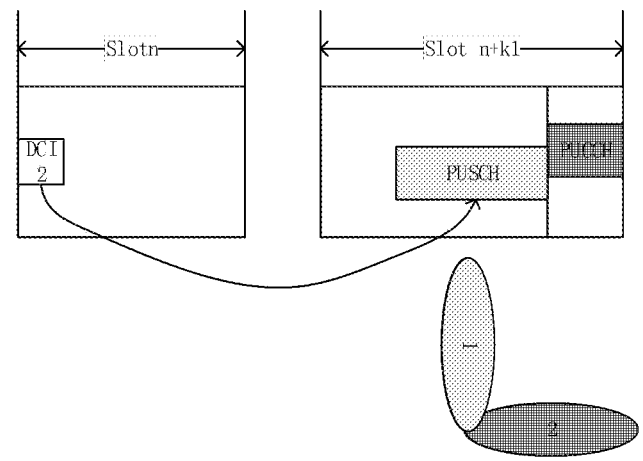
FIG. 3 is a schematic view illustrating PUSCH and PUCCH being transmitted in a time slot and initial transmitting beams being different according to an embodiment of the present application.

For example, the first signal is an uplink control signal and the second signal is an uplink data signal, and the uplink control signal and the uplink data signal are required to be transmitted in a same time unit (such as a slot, and other time unit are not excluded). As shown in FIG. 3, the downlink control information (DCI) on slot n triggers the transmission of uplink data channel PUSCH on slot n+k1. Meanwhile, the terminal is about to send the PUCCH on slot n+k1, but the transmitting beam (i.e., the second spatial filtering parameter of the second signal) of PUSCH is different from the initial transmitting beam (i.e., the first spatial filtering parameter of the first signal) of the PUCCH. Under such situation and according to beam transmission, how to transmit through PUSCH and PUCCH needs to be further confirmed. Herein, the transmitting beam for the PUSCH is signaled through DCI scheduling the PUSCH and/or a high level signaling. The high level signaling may be signaling from physical layer or above, such as radio resource control (RRC) signaling or media access control (MAC) signaling.

In some embodiments, the transmitting beam of the PUCCH is signaled by the DCI scheduling the PUCCH, or the DCI scheduling the PDSCH. The PUCCH includes ACK/NACK response information associates with the PDSCH.

In some embodiments, the spatial filtering parameters for the PUCCH may be signaled by high level signaling. For example, the PUCCH includes the periodic channel status information, and the transmission for the information on the PUCCH is triggered by the high level signaling. In summary, the time frequency resources occupied by the data and control signals, the transmitting beam of the PUSCH and the initial beam of the PUCCH are obtained through signaling information, as shown in FIG. 3 (FIG. 3 is for exemplary purpose, and other cases of time/frequency resources are not excluded). It is required to determine the transmission mode for the PUSCH and PUCCH considering the beam relationship of the PUSCH and PUCCH.

In some embodiments, the relationship between the transmitting beam (referred to the second transmitting beam hereinafter) of the PUSCH and the initial transmitting beam (referred to the first transmitting beam hereinafter) of the PUCCH is determined. It is determined whether the transmitting beam (i.e., the third spatial filtering parameter of the first signal, and is referred to the third transmitting beam hereinafter) for transmitting PUCCH has been changed according to the relationship. The PUCCH is subjected for transmission using a third transmitting beam.

Figure 4A:
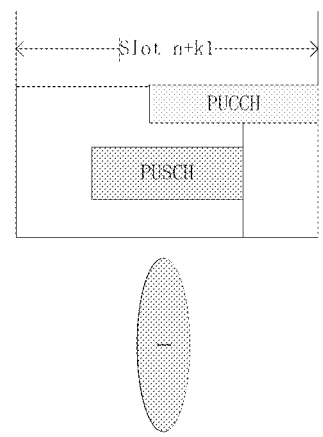
FIG. 4a is a schematic view illustrating the transmitting beam of PUCCH being changed according to the transmitting beam of PUSCH in an embodiment of the present application.
Figure 4B:
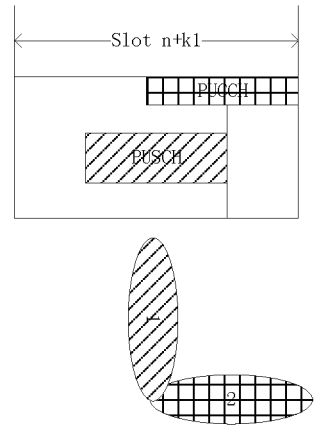
FIG. 4b is a schematic view illustrating PUSCH and PUCCH each adopting its own independent transmitting beam in an embodiment of the present application.

In some embodiments, if the first and second transmitting beams belong to different set of transmitting beams, the terminal will determine that the third transmitting beam is obtained according to the first transmitting beam, for example, the third transmitting beam is the first transmitting beam. Other corresponding relationship between the first and third transmitting beams is excluded, as shown in FIG. 4b. If the first and second transmitting beams belong to the same set of transmitting beam, the terminal will determine that the third transmitting beam is obtained according to the second transmitting beam, as shown in FIG. 4a.

Alternatively, if the first and second transmitting beams belong to the same set of transmitting beam, the terminal will determine the third transmitting beam is the first transmitting beam, as shown in FIG. 4b. If the first transmitting beam and the second transmitting beam belong to different set of transmitting beams, then the terminal will determine that the third transmitting beam is obtained according to the second transmitting beam, as shown in FIG. 4a.

Alternatively, if the first and second transmitting beams are generated simultaneously, the terminal determines that the third transmitting beam is the first transmitting beam, as shown in FIG. 4b. If the first and second transmitting beams are not generated simultaneously, the terminal determines that the third transmitting beam is obtained according to the second transmitting beam, as shown in FIG. 4a.

Alternatively, the third transmitting beam may be determined according to the relationship between the first transmitting beam and the second transmitting beam and whether the terminal may generate the first and second transmitting beams simultaneously. In some embodiments, if the first and second transmitting beams belong to the same set of transmitting beams and the terminal may simultaneously generate the first and second transmitting beams, the third transmitting beam may be obtained according to the second transmitting beam. If the first and second transmitting beams belong to the same set of transmitting beams and the terminal may not simultaneously generate the first and second transmitting beams, the third transmitting beam may be obtained according to the first transmitting beam. If the first and second transmitting beams belong to different sets of transmitting beams and the terminal may simultaneously generate the first and second transmitting beams, the third transmitting beam may be obtained according to the first transmitting beam. If the first and second transmitting beams belong to the same set of transmitting beams and the terminal may not simultaneously generate the first and second transmitting beams, the third transmitting beam may be obtained according to the second transmitting beam.

In the embodiments as described above, whether the transmitting beam for the first signal has been changed is determined according to the relationships between the transmitting beams. However, it is should not be ruled out that whether the transmitting beam for the first signal has been changed can also be determined based on control signaling. The control signaling includes at least one of the following:

A1: whether the second spatial filtering parameter of the first signal changes according to the spatial filtering parameter of the second signal. For example, when the signaling indicates that transmitting time interval between PUCCH and PUSCH is smaller than a predetermined threshold (such as in a slot, with other time interval not being excluded), the transmitting beam for PUCCH may be changed according to the transmitting beam of PUSCH. The terminal may further determine the exact transmitting beam for transmitting PUCCH according to the relationship between the transmitting beam for PUSCH and the initial transmitting beam for PUCCH. When the signaling indicates that the transmitting beam for PUCCH may not be changed according to the transmitting beam for PUSCH, the terminal will not perform the step one to step three as described above, and only need to adopt the initially deployed transmitting beam for PUCCH to transmit PUCCH.

B1: the multiplexing for the first and second signals. For example, if the signaling indicates that information of the first signal may be placed on the channel where the second signal is located for transmission (e.g., the UCI is placed on the channel where the PUSCH is located for transmission), the terminal will perform the step one to step three of the present embodiment. Whether the transmitting beam for PUCCH has been changed is determined according to the relationships between the transmitting beams, and whether the UCI is placed on PUSCH for transmission is determined. If the signaling indicates that the UCI cannot be placed on PUSCH for transmission, then the terminal will not perform the step one to step three, and the UCI will subject to transmission on PUCCH and the PUSCH will subject to transmission on PUSCH.

Alternatively, the indication signaling indicates that information of the first signal needs to be transmitted on the channel where the second signal is located (e.g., the UCI is to be placed on the channel where PUSCH is located for transmission), the terminal need not to perform the steps 1 to 3 as described above, and adopts the same transmitting beam as that of PUSCH to transmit the UCI and PUSCH. If the indication signaling indicates that the UCI and PUSCH may be respectively transmitted on their independent channels, the terminal performs the steps 1 to 3 of the present embodiment. It is determined, according to the relationships between the transmitting beams, whether the transmitting beam for UCI needs to be changed according to the transmitting beam for PUSCH.

The foregoing indication signaling may indicate that whether first signaling and the second signaling are placed in a channel coding block.

C1: the time interval information between the first and second signals. If the time interval between the first and second signals is greater than a predetermined threshold, the PUSCH and PUCCH will be transmitted through their respective transmitting beams, and the step one to step three will not be performed. If the time interval is smaller than the predetermined threshold, then the step one to the step three will be performed.

D1: whether the first and second signals sharing a configuration of one spatial filtering parameter. If the PUSCH and PUCCH share the configuration of one spatial filtering parameter, the step one to the step three of the present embodiment will not be performed. That is to say, the transmitting beams for PUSCH and PUCCH are the same. Otherwise, the step one to the step three will be performed.

E1: a peer end indication information corresponds to the first and second signals. When the signal is the transmitting signal, the peer end is the receiving end (e.g., if the signal is an uplink signal, the peer end indication information is a carrier frequency number, a cell ID number, or a cell group ID number). If the signal is the receiving signal, the peer end is the transmitting end (e.g., if the signal is a downlink signal, the peer end is the base station). It is determined, according to whether the peer end indication information of the first and second signals are the same (or belong to the same set of peer end), whether the transmitting beam for PUCCH is changed according to the transmitting beam for PUSCH. For example, when the peer end indication information are the same, the step one to the step three of the present embodiment is performed. Otherwise, the step one to the step three of the present embodiment is not performed.

F1: a first instructive information. The first instructive information indicates whether to determine a second spatial filtering parameter for transmitting the first signal according to the relationships. That means an explicit signaling is used to indicate whether to perform the step one to the step three. When the explicit signaling indicates that the step one to the step three need not to be performed, the steps will not be performed, or otherwise, the step one to the step three are performed.

Other situations that the parameters of A~F not being included in the signaling information should not be excluded. The parameters may be obtained by other manners.

In the previous embodiment, the first signal is PUSCH, and the second signal is PUCCH. However, the first signal may not exclude the case where the first signal is PUCCH and the second signal is PUSCH. For example, PUSCH may be cross slots scheduled PUSCH, or semi-continuous schedule PUSCH. PUCCH may be dynamically scheduled, or scheduled after PUSCH. In this regard, the transmitting beam for PUSCH may be changed according to the transmitting beam of PUCCH.

In some embodiments, the combination for the first and second signals may be one of the following: PUSCH and SRS, non-periodic PUCCH and periodic PUCCH, non-periodic SRS and periodic SRS, and two non-periodic SRS.

The non-periodic PUCCH may be non-periodically transmitted PUCCH. In this regard, the time interval between two PUCCH transmission may not be constant. It may be random for example.

In the above-described embodiment, the first and second signals may be uplink signals. In some other embodiments, the first and second signals may also be downlink signals, or the first signal is a downlink signal and the second signal is an uplink signal. Alternatively, the first signal may be an uplink signal and the second signal may be a downlink signal. In some embodiments, when the signals are downlink signals, the spatial filtering parameters are spatial filtering parameters for receiving. When the signals are uplink signals, the spatial filtering parameters are spatial filtering parameters for transmitting.

In some embodiments, the spatial filtering parameters belong to the same set of spatial filtering parameters. The receiving ends corresponding to the spatial filtering parameters have the same receiving beams, or the corresponding terminals may simultaneously generate these spatial filtering parameters, or the performance may be greater than a predetermined threshold in a case of a receiving beam combination of the receiving end corresponding to the spatial filtering parameters. The embodiments do not exclude the case where the set of spatial filtering parameters correspond to some other receiving features of other receiving ends.

In the present embodiment, the step one to the step three as described above may be altered to the following:

Step 1: determine the relationship between a first reference signal relating to the first signal and a second reference signal relating to the second signal;

Step 2: determine a spatial filtering parameter of the first signal according to the relationship; and Step 3: transmit the first signal using the determined spatial filtering parameter.

Herein, a first spatial filtering parameter of the first signal is obtained according to the first reference signal, and a second spatial filtering parameter of the second signal is obtained according to the second reference signal.

In the present embodiment, the terminal performs the following steps:

Step 1: determine a relationship between the first spatial filtering parameter of the first signal and the second spatial filtering parameter of the second signal;

Step 2: determine a multiplexing manner for the first and second signals according to the relationship; and Step 3: transmit the first and/or second signals using the determined multiplexing manner.

In some embodiments, the multiplexing of the first and second singles is determined according to whether the spatial file parameters for the first and second signals belong to the same set of spatial filtering parameter, and/or the multiplexing of the first and second singles is determined according to whether the spatial file parameter for the first signal and the spatial file parameter for the second signal may be generated simultaneously.

For example, the first signal is an uplink control signal and the second signal is an uplink data signal, and the uplink control signal and uplink data signal need to be transmitted in one time unit (e.g., slot, with other situation being not ruled out). As shown in FIG. 3, on slot n, the transmission for uplink data channel PUSCH on slot n+k1 is triggered by the DCI (Downlink Control Information), and in the meantime, the terminal needs to send the PUCCH on slot n+k1. However, the transmitting beam (i.e., the second spatial filtering parameter of the second signal) of PUSCH is different from the transmitting beam (i.e., the first spatial filtering parameter of the first signal) of the PUCCH. Herein, the transmitting beam for the PUSCH is signaled through the DCI scheduling the PUSCH and/or a high level signaling, the transmitting beam for PUCCH is signaled through the DCI scheduling the PUCCH, or the DCI scheduling the PDSCH. Herein, the PUCCH includes the ACN/NACK feedback information of the PDSCH. Alternative, the transmitting beam for the PUCCH is signaled through high level signaling, such as the channel status information included in the PUCCH, especially the periodic channel status report information. In sum, by signaling information, the time-frequency resources occupied by the data and control signals and the transmitting beams of the data and control signals may be obtained, as shown in FIG. 3 (FIG. 3 is for exemplary purpose, and cases for other time-frequency resources are not excluded). The multiplexing for PUSCH and PUCCH needs to be further considered due to beam transmission. The beam relation between the data and control signals needs to be considered for the determination of the multiplexing of PUSCH and PUCCH.

In the present embodiment, the multiplexing may include one or more of the following:

A: the first and second signals being transmitted on a channel on which the second signal is located, the first signal being not transmitted on its original channel;

B: the first signal being transmitted on a channel on which the first signal is transmitted, the second signal being transmitted on a channel on which the second signal is located;

In some embodiments, when the transmitting beam for the data signal and the transmitting beam for the control signal belong to the same set of transmitting beams, the data signal and the control signal are transmitted on data channel. For example, the UCI and data signal are transmitted on PUSCH. That is, multiplexing approach A is adopted. When the transmitting beam for the data signal and the transmitting beam for the control signal belong to different sets of transmitting beams, the control signal will not be transmitted on the channel where the data signal is located. That is, multiplexing approach B is adopted.

Alternatively, when the transmitting beam for the data signal and the transmitting beam for the control signal belong to different sets of transmitting beams, the data and control signals will be transmitted on the data channel. For example, the UCI and the data signal are transmitted over the PUSCH. That is, the multiplexing approach A is adopted. When the transmitting beam for the data signal and the transmitting beam for the control signal belong to the same set of transmitting beams, the control signal will not be transmitted on the channel where the data signal is located. That is, multiplexing approach B is adopted.

A-1: the first and second signals are transmitted over the channel on which the second signal is located, and the first signal is also transmitted over the channel on which the first signal is located.

For example, when the transmitting beam for the data signal and the transmitting beam for the control signal belong to the same set of transmitting beams, the data and control signals will be transmitted on the data channel. For example, the UCI and the data signal are transmitted over the PUSCH. That is, the multiplexing approach A is adopted. When the transmitting beam for the data signal and the transmitting beam for the control signal belong to different sets of transmitting beams, control information are transmitted on both the data channel and the control channel which corresponds to a channel where the control information is located. That is, the multiplexing approach A-1 is adopted. In the present embodiment, the control channel means it carries control information, and the data channel means it carries data information. When data scheduling is not needed, the control information should be placed on the control channel, and when data scheduling is involved, the channel where the control information is located needs to be adjusted.

C: the first and second signals being time division multiplexed;

D: the first and second signals being frequency division multiplexed;

E: the first and second signals being code division multiplexed;

When the transmitting beam for the data signal and the transmitting beam for the control signal belong to the same set of transmitting beams, the data and control signals may be transmitted over the same time domain symbol. For example, the PUCCH and PUSCH are frequency and/or code division multiplexed. When the transmitting beam for the data signal and the transmitting beam for the control signal belong to different sets of transmitting beams, the data and control signals cannot be transmitted over the same time symbol. For example, the PUCCH and PUSCH may neither frequency division multiplexed nor code division multiplexed, but only may be time division multiplexed, or one among must be ditched.

Alternatively, the transmitting beam for the data signal and the transmitting beam for the control signal may be generated simultaneously, the data and control signals may be transmitted over the same time domain symbol. For example, the PUCCH and PUSCH may be frequency division multiplexed and code division multiplexed. When the transmitting beam for the data signal and the transmitting beam for the control signal cannot be generated simultaneously, the data and control signals may not be transmitted over the same time symbol. For example, the PUCCH and PUSCH may neither frequency division multiplexed nor code division multiplexed, but only may be time division multiplexed, or one among must be ditched.

Alternatively, when the transmitting beam for the data signal and the transmitting beam for the control signal belong to the same set of transmitting beams and may be generated simultaneously, the data and control signals may be transmitted over the same time domain symbol. For example, the PUCCH and PUSCH are frequency and/or code division multiplexed. Otherwise, the data and control signals cannot be transmitted over the same time domain symbol. For example, the PUCCH and PUSCH may neither frequency division multiplexed nor code division multiplexed, but only may be time division multiplexed, or one among must be ditched.

F: the first and second signals being time division multiplexed and a time interval in between being smaller than or equal to a predetermined threshold;

G: the first and second signals being time division multiplexed and a time interval in between being greater than or equal to a predetermined threshold;

For example, when the transmitting beam for the data signal and the transmitting beam for the control signal belong to the same set of transmitting beams, the transmission time interval in between is smaller than or equal to the predetermined threshold. Otherwise, the transmission time interval in between is greater than or equal to the predetermined threshold.

Alternatively, when the transmitting beam for the data signal and the transmitting beam for the control signal may be generated simultaneously, the transmission time interval in between is greater than or equal to the predetermined threshold.

H: the first and second signals share one cyclic redundancy check (CRC) information;

I: each of the first and second signals has its own independent CRC information;

J: information of the first signal and information of the second signal are collectively went through channel coding;

K: information of the first signal and information of the second signal are independently went through channel coding;

For example, when the transmitting beam for the data signal and the transmitting beam for the control signal belong to the same set of transmitting beams, the multiplexing for data and control signals may be H and/or J. Otherwise, the multiplexing may be I and/or K.

The above mentioned implementation is to determine the multiplexing for the first and second signals according to the relationship between the transmitting beams. However, it does not exclude in the embodiment that the determination of the multiplexing for the first and second signals may be made according to control signaling. Herein, the control signal may include one of the following:

A2: the predetermined multiplexing for the first and second signals. For example, the indication signaling may indicate to place information of the first signal on the channel where the second signal in located for transmission (e.g., the UCI may be placed on the channel where the PUSCH is located), then the terminal may further determine the multiplexing for the UCI and data according to the relationship. If the indication signaling indicates that the UCI may not be placed on the channel where the PUSCH is located, then the terminal will not perform the step one to the step three of the present embodiment.

Alternatively, the indication signaling indicates that information of the first signal is to be placed on the channel where the second signal is located for transmission (e.g., the UCI is to be placed on the channel where the PUSCH is located for transmission), then the terminal needs not to perform the step one to the step three of the present embodiment, but to directly place the UCI on the PUSCH. The same transmitting beam as that of PUSCH is taken for transmitting the UCI and data. If the indication signaling indicates that each of the UCI and PUSCH needs to be transmitted on its independent channel, then the terminal needs to determine the multiplexing between the UCI and data according to the relationship.

For example, if the frequency/code/time division multiplexing is predetermined for the first and second signals, or the resources occupied by the first and second signals on time domain exhibits overlaps, then the step one to the step three need to be performed. Otherwise, the step one to the step three need not to be performed.

The indication signals may also indicates that the first and second signals are placed in an information block ahead of channel coding for joint channel coding, or that the first and second signals are placed on two independent information blocks ahead of channel coding for independent channel coding.

B2: the time interval information between the first and second signals. If the time interval of the first and second signals is greater than a predetermined threshold, then the multiplexing approach B is adopted for the UCI and data, with the step one to the step three not being performed. If the threshold is smaller than the predetermined threshold, then the step one to the step three are performed.

C2: whether first and second signals share a configuration of the same spatial filtering parameter. If the PUSCH and PUCCH always share the configuration of the same spatial filtering parameter, then the step one to the step three are performed. Otherwise, the step one to the step three is performed.

D2: the peer end indication information corresponding to the first and second signals. When the signal is a transmitting signal, then the peer end is a receiving end (e.g., the signal is an uplink signal, and the peer end indication information is a carrier frequency number, a cell ID number, or a cell group ID number). If the signal is a receiving signal, the peer end is the transmitting end. If peer ends for the two signals belong to the same group, then the step one to the step three are performed. Otherwise, the step one to the step three are not performed. Due to the fact that peer ends for the two signals belong to the different sets of peer ends, the UCI and data may be transmitted to different base stations.

E2: a first indicative information. The first indicative information indicates whether to determine the multiplexing for the first and second signals according to the relationship. In other words, explicit signaling is used to indicate whether to perform the step one to the step three. When the explicit signaling indicates that the step one to the step three need not to be performed, the step one to the step three will not be performed.

However, the parameters as described in A2~E2 being not included in the signaling information should not be excluded in the present embodiment. The parameters may be obtained through other approaches.

In some embodiments, the combination of the first and second signals may be one of the following combinations: PUSCH and SRS, non-periodic PUCCH and periodic PUCCH, non-periodic SRS and periodic SRS, and two non-periodic SRS.

In the above-described embodiment, the first and second signals may be uplink signals. In some other embodiments, the first and second signals may also be downlink signals, or the first signal is a downlink signal and the second signal is an uplink signal. Alternatively, the first signal may be an uplink signal and the second signal may be a downlink signal.

The steps 1 to 3 of the present embodiment may be altered as the following steps:

Step 1: determine the relationship between the first reference signal relating to the first signal and the second reference signal relating to the second signal;

Step 2: determine the multiplexing for the first and second signals according to the relationship;

Step 3: transmits the first signal and/or the second signal using the determined multiplexing approach.

A first spatial filtering parameter of the first signal is obtained according to the first reference signal, and a second spatial filtering parameter of the second signal is obtained according to the second reference signal.

In the present embodiment, the terminal performs the following steps:

Step 1: determine the relationship between the first spatial filtering parameter of the first signal and the second spatial filtering parameter of the second signal;

Step 2: determine the resources occupied by the first signal and/or the resources occupied by the second signal;

Step 3: transmit the first signal and/or the second signal with the determined resources.

The resources include at least one of the following: time domain resource, frequency domain resource, code domain resource and spatial domain resource.

Figure 5:
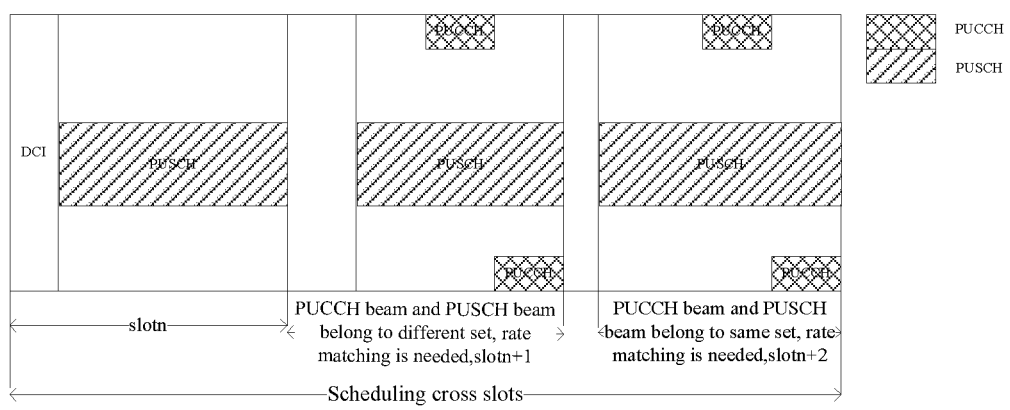
FIG. 5 is a schematic view illustrating the resource occupied by a scheduled PUSCH when scheduling is performed across slots in an embodiment of the present application.
Figure 6:
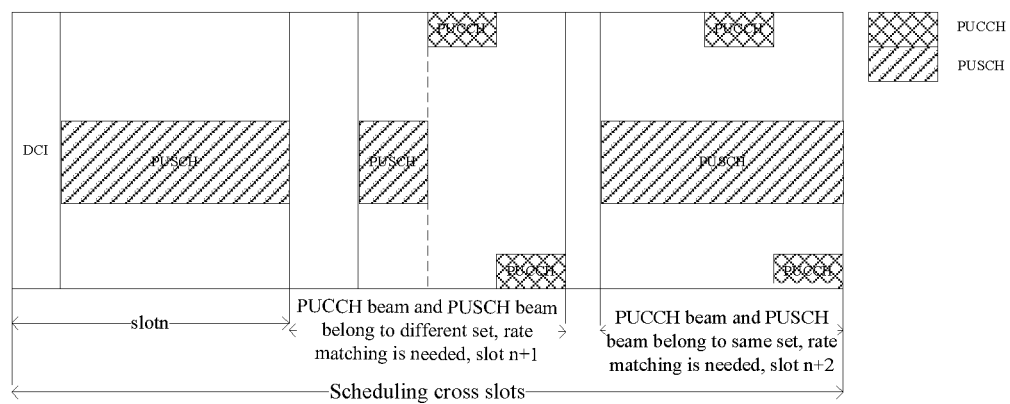
FIG. 6 is a schematic view illustrating the time frequency resources occupied by PUSCH being determined according to the relationship between the beam transmitted through PUSCH and the beam transmitted through PUCCH in an embodiment of the present application.

Regarding cross slots scheduling, FIG. 5 illustrates the resource of PUSCH scheduled on slot n. However, slot scheduling for PUCCH also happens on slot n+1 and slot n+2 (e.g., the PUCCH may be a PUCCH feedback from periodic CSI, or the PUCCH may be a non-periodic CSI feedback triggered on slot n+1 and slot n+2, with other situations for PUCCH resources being not excluded). In such situation, the transmitting beams for PUSCH and PUCCH may not be consistent, so that further confirmation of the resources occupied by the PUSCH need to be made. For example, on slot n+1, the transmitting beams for the PUSCH and PUCCH do not belong to the same set, and the priority of PUCCH is higher than that of PUSCH. Then, it is required to make rate matching for PUSCH on the time domain symbol of the PUCCH, or the PUSCH is not transmitted, as shown in FIG. 6. On slot n+2, the transmitting beams for the PUSCH and PUCCH belong to the same set (in which a set of transmitting beams indicates that the terminal may simultaneously generate the beams, and/or a same set of the transmitting beams indicates that the base station may simultaneously receive the beams). Then the PUSCH and PUCCH may be simultaneously transmitted on slot n+2. It is not required to make rate matching for PUSCH on the time domain symbol of the PUCCH, or the PUSCH is not transmitted. The two may be transmitted on respectively independent channels, as shown in FIG. 6. Further, the UCI may be transmitted over PUSCH on slot n+2.

In the present embodiment, the step one to the step three as described above may be altered to the following:

Step 1: determine the relationship between the first reference signal relating to the first signal and the second reference signal relating to the second signal;

Step 2: according to the relationship, determine the resource of the first signal and/or the resource occupied by the second signal;

Step 3: transmit the first signal and/or the second signal with the determined resource; for example, obtaining the first spatial filtering parameter of the first signal according to the first reference signal, and obtaining the second spatial filtering parameter of the second signal according to the second reference signal.

Spatial filtering parameters of signals are described in the above embodiments. In the present embodiment, how to obtain the spatial filtering parameters will be detailed.

For example, if the signal is PUSCH, then the spatial filtering parameters of the PUSCH may be obtained through the following: through establishing an association between a DMRS (Demodulation Reference Signal) of the PUSCH and an upload measurement reference signal, such as establishing an association between a DMRS and SRI (in which SRI is the indication information of SRS resource, and SRS is a kind of uplink reference signal and the abbreviation of Sounding Reference Signal), the transmitting spatial filtering parameter of PUSCH may be obtained according to the transmitting spatial filtering parameter of the SRS indicated by the SRI. In some embodiments, association between the DMRS of PUSCH (Physical Uplink Shared Channel) and other uplink reference signals may also be established. Other uplink reference signals may include: random access preamble sequence, the DMRS of PUCCH, the DMRS of another PUSCH, resource request signal. In the regard, the transmitting spatial filtering parameters of the PUSCH may be obtained according to the transmitting spatial filtering parameters of other reference signals relating thereto.

Alternatively, the association between the DMRS of the PUSCH and a downlink reference signal may be established. In this regard, the transmission spatial filtering parameter of the PUSCH is obtained according to filter parameter of the downlink signal received by the terminal; or, the transmission spatial filtering parameter of the PUSCH is obtained according to transmission spatial filter of the base station of the downlink reference signal related thereto (i.e., the receiving filter parameters used by the base station for receiving the uplink signal). Herein, the downlink reference signal may include at least one of the following: measurement reference signal, demodulation reference signal, synchronization signal and phase tracking reference signal.

The association between the signal and the reference signal may also be quasi-co-location (QCL), which means that the channel character parameters of the signal can be obtained by the derivation of the channel character parameters of the reference signal. Herein, the channel character parameters include at least one of the following: delay spread, Doppler spread, Doppler offset, average delay, average gain, average vertical transmission angle, average horizontal transmission angle, average vertical arriving angle, average horizontal arriving angle, central vertical transmission angle, central horizontal transmission angle, central vertical arriving angle and central horizontal arriving angle.

Spatial filtering parameters sets are discussed in the foregoing embodiments. In the present embodiment, acquisition of sets of the spatial filtering parameters will be detailed.

The sets of spatial filtering parameters may be informed by the base station, for example, different SRS resources representing different transmission beams. The base stations, through informing that some SRS resources belonging to the same set, such as that the receiving beams of the base station corresponding to the SRS resources are the same, or that the base station may receive one SRS resource set at the same time, the resources from different SRS resource set cannot be received simultaneously. Therefore, as long as the terminal adopt the transmission beam in this SRS resource set for signal transmission, the base station may always receive the signal. Alternatively, the base station may not receive different SRS resources in a set of SRS resources at the same time, and can receive different SRS resources in different sets of SRS resources at the same time.

Figure 7:
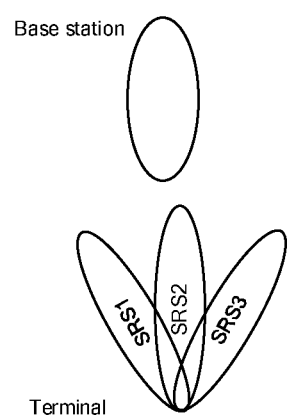
FIG. 7 is a schematic view illustrating an SRS in an SRS resource set corresponding to a beam received by a base station in an embodiment of the present application.

In some embodiments, for example, the base station informs that SRS1 and SRS 2 belong to the same set of transmitting beam, and then it may be obtained that the transmission spatial filtering parameters of the PUSCH and the transmission spatial filtering parameters of the PUCCH belong to the same set of spatial filtering parameter when the DMRS of the PUSCH associates with SRS 1 and the DMRS of PUCCH associates with SRS 2, as shown in FIG. 7.

Acquisition manner for the set of the spatial filtering parameters may be transmitted by the terminal. For example, the terminal transmits the grouping status of the SRS resource to the base station. Or in another example, the terminal may generate the SRS resources in a set of SRS resources at the same time, and the terminal can not generate the SRS resources in different sets of SRS resources. Alternatively, the SRS resources in a set of SRS resource can not be generated at the same time, but the terminal may generate the SRS resources in different sets of SRS resources.

Acquisition manner for the set of the spatial filtering parameters may be determined based on both notification from the base station and transmission from the terminal. For example, the set of SRS resources informed by the base station belong to a set of resources sent by a terminal. Or, different SRS resources from the set of the SRS resources informed by the base station come from different sets of SRS resources transmitted from the terminal.

The approach for obtaining spatial filtering parameters as described above may, in some other embodiments, be used for the acquisition of the of the set of SRS reference signal, and/or the set of SRS reference signal resource.

In the present embodiment, it will be detailed in the following that the channel for the first signal is adjusted according to the channel where the second signal is located.

In some embodiments, for example, the first signal is an uplink control information (UCI), and the second signal is a data information. When there is no data scheduling, the UCI will be transmitted over the PUCCH.

When there's data scheduling, it is required to confirm the channel for the first signal lies in which case of the following: the first signal being transmitted on the channel where the first signal is located, such as the UCI being transmitted on the PUCCH; the first signal being transmitted on the channel where the second signal is located, such as the UCI being transmitted on the PUSCH rather than the PUCCH; the first signal being transmitted on both the channel where the first signal is located and on the channel where the second signal is located, such as the UCI being transmitted on the PUSCH as well as the PUCCH.

In the present embodiment, the terminal sends time delay required for switching the spatial filtering parameters to the base station. Herein, different spatial filtering parameters correspond to different transmitting beams, and/or different panels.

For example, a terminal has 4 spatial filtering parameters (parameter 1, parameter 2, parameter 3, and parameter 4). Switching time delays for different pairs of parameters are different. For example, the switching time delay for (parameter 1, parameter 2) is delay 1, and the switching time delay for (parameter 1, parameter 3) is delay 2. The terminal may group the pairs of parameters, where the switching time delays are the same in the same group. Alternatively, the terminal may group the parameters, and the switching time delays for different reference signals in different groups are informed to the base station.

Alternatively, the terminal informs the base station the minimum switching time delay in the switching time delays for all pairs of the parameters. For example, the switching time delay of (parameter 1, parameter 2) is delay 12, the switching time delay of (parameter 1, parameter 3) is delay 13, the switching time delay of (parameter 1, parameter 4) is delay 14, the switching time delay of (parameter 2, parameter 3) is delay 23, the switching time delay of (parameter 2, parameter 4) is delay 24, the switching time delay of (parameter 3, parameter 4) is delay 34. In such situation, the terminal will inform the base station the maximum among (delay 12, delay 13, delay 14, delay 23, delay 24, and delay 34). Or, the terminal informs the base station with all the switching time delays.

When different spatial filtering parameters are characterized through different reference signals or different reference signal resources, the switching time delays of the spatial filtering parameters may also be referred to as the switching time delays of the reference signals.

In the present embodiment, the resources that may be occupied by the first signal change according to the resources occupied by the second signal.

In some embodiments, for example, the first signal being a data signal and the second signal being a control signal, the ending position of the time domain symbol of the data signal is represented through two bits of DCI. If the resources occupied by the second signal are different, the ending position of the time domain symbol represented by the two bits may be different.

Figure 8A:
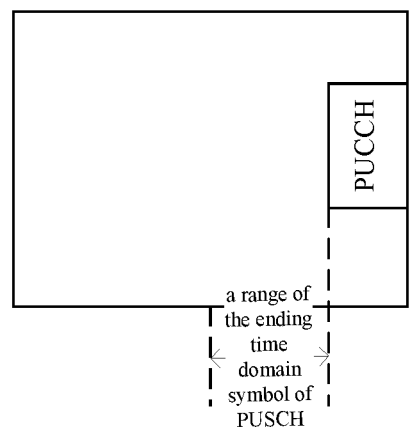
FIG. 8a is a first schematic view illustrating the ending time domain symbol position of PUSCH being changed according to the resources occupied by PUCCH in an embodiment of the present application.

As shown in FIG. 8a, the resource occupied by the PUCCH is the 14th OFDM symbol in one slot, therefore, it is informed that meanings of the two DCI representations at the ending position of the time domain symbol for PUSCH are listed in table 1:

| DCI value | ending position of PUSCH |
|---|---|
| 0 | 11 |
| 1 | 12 |

Figure 8B:
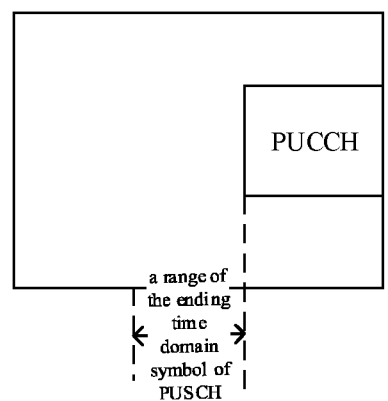
FIG. 8b is a second schematic view illustrating the ending time domain symbol position of PUSCH being changed according to the resources occupied by PUCCH in an embodiment of the present application.

As shown in FIG. 8b, the resource occupied by the PUCCH is the (13, 14)th OFDM symbol in one slot, therefore, it is informed that meanings of the two DCI representations at the ending position of the time domain symbol for the PUSCH are listed in table 1:

| DCI value | ending position of PUSCH |
|---|---|
| 0 | 10 |
| 1 | 11 |

Figure 8C:
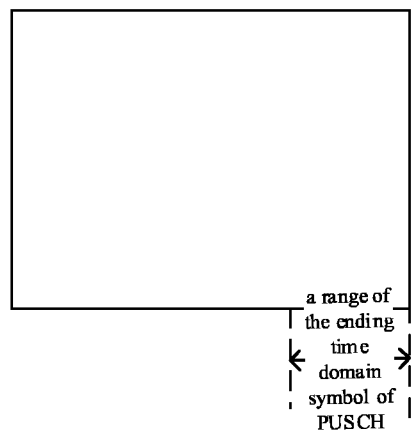
FIG. 8c is a third schematic view illustrating the ending time domain symbol position of PUSCH being changed according to the resources occupied by PUCCH in an embodiment of the present application.

As shown in FIG. 8c, the PUCCH occupies no resources in the slot, it is informed that meanings of the DCI representation at the ending position of the time domain symbol for the PUSCH are listed in table 1:

| DCI value | ending position of PUSCH |
|---|---|
| 0 | 12 |
| 1 | 13 |

Further, the range of the time domain symbol that may be occupied by the ending position of the first signal may be determined according to the relationship information between the first and second reference signals, and the resources occupied by the second signal. Herein, the first reference signal relates to the first signal, or the first reference signal relates to the demodulation reference signal of the first signal. The second reference signal relates to the second signal, or the second reference signal relates to the demodulation reference signal of the second signal.

In the present embodiment, the relationship between the first and second signals, the first signal and the second satisfy at least one of the following:

the transmission directions of the first and second signals being the same (such as, both the first signal and the second signal are uplink signals, or both the first signal and the second signal are downlink signals);

the first and second signals being transmitted within a time unit, such as, the time unit for transmission being a slot or a sub-frame;

the first signal or the second signal includes at least one of the following: data signal, control signal, reference signal, random access signal, resource request signal;

a control signaling for triggering a transmission of the first signal being prior to a control signaling for triggering a transmission of the second signal;

an information of the first signal being obtained through a high level signaling;

an information of the second signal being obtained through a physical layer dynamic control signaling;

the first signal being triggered by the high level signaling;

the second signal being triggered by the physical layer dynamic control signaling; and a priority of the first signal being higher than a priority of the second signal.

The target user of the first signal is different from that of the second signal. For example, for uplink signal, the first signal may be the transmitting signal of the first user, and the second signal may be the transmitting signal of the second user; or, for downlink signal, the first signal may be the receiving signal of the first user and the second signal may be the receiving signal of the second user.

Figure 9:
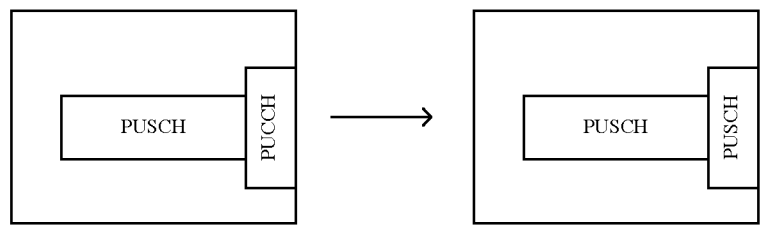
FIG. 9 is a schematic view illustrating the time frequency resources occupied by PUSCH being changed to the time frequency resources occupied by the two channels of PUSCH and PUCCH in an embodiment of the present application.

In the present embodiment, the resources occupied by the first signal may be changed according to the resources occupied by the second signal. For example, the first signal is a PUSCH channel signal and the second signal is a PUCCH signal. When it is determined that the information (e.g., the periodic CSI information) included in the PUCCH may be transmitted over the PUSCH channel, which means that the UCI and data are placed on PUSCH for transmission, then the resources occupied by the PUSCH is the PUSCH resource indicated by the PUSCH scheduling information and the resources occupied by the PUCCH (e.g., the resources occupied by the PUCCH indicated by high level signaling). As shown in FIG. 9, the two resources are combined into one resource for transmission of the UCI and data over the PUSCH, as shown on the right side of FIG. 9. What illustrated in FIG. 9 is only for exemplary purpose, other cases for occupation are not excluded in the embodiment. For example, if it is determined that the UCI cannot be transmitted over the PUSCH, then the resources occupied by the PUSCH is as illustrated on the left side of FIG. 9.

In the present embodiment, the demodulation reference signal of the first signal changes according to the resources occupied by the second signal. For example, the first signal is a PUCCH and the second signal is a PUSCH, and two channels are assigned to the sender when needed. If the frequency domain resources occupied by the PUCCH are a subset of the frequency domain resources occupied by the PUSCH, then the demodulation reference signal of the PUCCH will not be transmitted. Preferably, the resources occupied by the demodulation reference signal of the PUCCH may be adopted to transmit the control information of the PUCCH.

Alternatively, if there is a demodulation reference signal of the PUSCH whose distance from an initial time domain symbol of the PUCCH is smaller than a predetermined value, then the demodulation reference signal of the PUCCH will not be transmitted. Preferably, the resources occupied by the demodulation reference signal of the PUCCH may be adopted to transmit the control information of the PUCCH.

In the present embodiment, the multiplexing for the first and second signals is determined according the switch delay between the first spatial filtering parameter of the first signal and the second spatial filtering parameter of the second signal.

For one example, the first signal is a PUSCH and the second signal is a PUCCH. When it is determined according to the scheduling information that the transmission time between the two is greater than or equal to the switching time delay, the PUCCH and the PUSCH may be transmitted on each channel through time multiplexing.

For another example, the first signal is a PUSCH and the second signal is a PUCCH. When it is determined according to the scheduling information that the transmission time between the two is smaller than the switching time delay, one of the PUCCH and PUSCH is needed to be abandoned. Or, the UCI included in the PUCCH is placed on the PUSCH for transmission.

The switching time delay may be the capability information reported by the terminal. That is, different pairs of spatial filtering parameters will not be distinguished, and all the switching time delays for all pairs of the spatial parameters are the same, or the switching time delay is the minimum of the switching time delays corresponding to different spatial filtering parameters. As shown in embodiment of FIG. 7.

In the present embodiment, the transmission manner of the first signal is determined according to the relationship information between a peer end indication information corresponding to the first signal and a peer end indication information corresponding to the second signal.

When the signal is a transmitting signal, then the peer end is a receiving end for receiving instructive information, for example, from the terminal. When the signal is an uplink signal, then the peer end is a base station or a communication node end. When the signal is a receiving signal, then the peer end is a transmitting end for transmitting instructive information, for example, from the terminal. When the signal is a downlink signal, then the peer end is a base station or a communication node end corresponding to the downlink signal.

Figure 10:
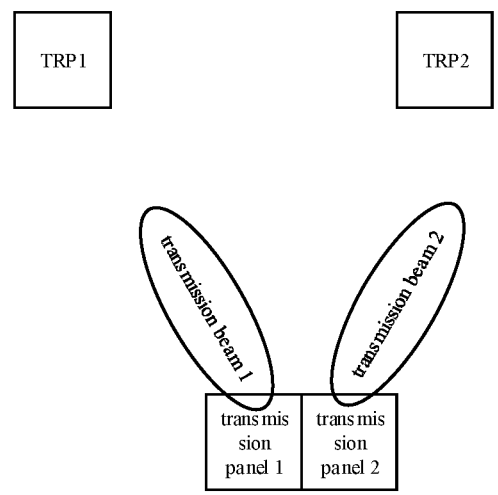
FIG. 10 is a schematic view illustrating whether the peer end indication information corresponding to the first signal being identical to the peer end indication information corresponding to the second signal.

As shown in FIG. 10, when the peer end indication information of the first signal is 1 (corresponds to TRP 1), and the peer end indication information of the second signal is 2 (corresponds to TRP 2), the first and second signals cannot be combined into one channel for transmission provided that the peer end indication information 1 and peer end indication information 2 do not belong to the same set, rather, the first and second signals are transmitted over each independent channel. Or, the first and second signals cannot form an information block that is to be placed before channel coding for joint coding, independent channel coding may be performed for the first and second signals. Therefore, independent transmission channel and/or coding channel are allocated for the first and second signals. If the peer end indication information 1 and peer end indication information 2 belong to the same set, then the first and second signals may be combined into one channel for transmission, or may form an information block before channel coding for joint coding. The peer end indication information may be transmitted to a terminal from a base station, or to a base station from a terminal, for example, if the terminal informs the base station that the two uplink signals cannot be combined, as these signals are transmitted from different panels, such as transmitted from panel 1 or panel 2 shown in FIG. 10. In some embodiments, ideal backhaul exists in between communication nodes in one set of peer end indication information. Or, the communication nodes have adjacent geographical positions, or the transmission time delay is smaller than a determined threshold. For example, the set of peer end indication information is indicated by high level signaling, and the peer end indication information of the signal is indicated by dynamic signaling. Or, it can be determined, according to whether the first and second signals correspond to the same DCI group, that whether the peer end indication information of the two belong to the same set. Herein, the DCI set is classified through one of the following resources for the DCI: common control resource set (Coreset), candidate set, search space, aggregation level, the QCL reference signal associated with the demodulation reference signal of the DCI. For example, the search spaces for the DCI that schedules the first signal and the DCI that schedules the second signal are the same, then the peer end indication information of the first and second signals belong to the same set of peer end indication information.

The common control resource set may carry information such as a portion of optical system information carried by physical broadcast channel or information carried by physical downlink control channel. However, this is illustrated as an example, and is not limited thereto.

In some embodiments, the transmission modes of the first signal and the second signal is determined according to whether the peer end indication information of the first signal and the peer end indication information of the second signal are the same. For example, if the peer end indication information of the first signal and the peer end indication information of the second signal are not the same, then the first and second signals cannot be transmitted over the same channel, rather they must be transmitted over two independent channels. Alternatively, the first and second signals cannot form an information block before channel coding for joint coding, rather they each subjects to independent channel coding. If the peer end indication information of the first signal and the peer end indication information of the second signal are the same, then the first and second signals may be transmitted over the same channel, and they may form an information block before channel coding for joint coding. In the present application, the spatial filtering parameters may also be referred to as beam parameters, channel characteristic parameters, precoding weight parameters, or other equivalent names, which do not have a substantial impact on the inventiveness of the present application. The spatial filtering parameters include transmitting spatial filtering parameters, and/or receiving spatial filtering parameters.

In the present application, in some embodiments, the interval between the initial transmission time of the first signal and the initial transmission time of the second signal is smaller than a predetermined threshold.

In the present application, the transmission mode is determined, which may also be referred to as determining the transmission parameter, and the first signal and/or the second signal is transmitted using the determined transmission parameters.

In this application, the resource includes at least one of the following resources: a time domain resource, a frequency domain resource, a code domain resource, a spatial domain resource, and a sequence resource.

One of ordinary skill in the art will appreciate that all or a portion of the above steps may be performed by a program to instruct related hardware (e.g., a processor), and the program may be stored in a computer readable storage medium, such as a read only memory, disk or optical disk. In some embodiments, all or part of the steps of the above embodiments may also be implemented using one or more integrated circuits. Correspondingly, each module/unit in the above embodiment may be implemented in the form of hardware, for example, through an integrated circuit to implement its corresponding function, or may be implemented in the form of a software function module, for example, through a processor to implement a program/instruction stored in the storage to achieve its corresponding function. This application is not limited to any specific combination of hardware and software.

The above shows and describes the basic principles and main features of the application and the advantages of the application. The application is not limited by the above-mentioned embodiments. The above-mentioned embodiments and specifications only describe the principles of the application. Without departing from the spirit and scope of the application, there will be various changes and improvements in the application, all of which fall within the protection scope of the application.

The invention claimed is:

1. A method for signal transmission based on a relationship between a first signal and a second signal, comprising:
   determining a transmission mode of the first signal according to the following: a relationship information between a downlink control information (DCI) corresponding to the first signal and a downlink control information corresponding to the second signal, wherein the first signal and the second signal comprise uplink control information; and
   sending or receiving the first signal using the determined transmission mode;
   wherein the determined transmission mode comprises a multiplexing mode between the first signal and the second signal.

2. The method of claim 1, wherein the first signal and the second signal satisfy:
   a transmission direction of the first signal being the same as a transmission direction of the second signal;
   the first signal and the second signal being transmitted within a time unit; and
   an intersection of resources occupied by the first signal and resources occupied by the second signal in time domain is not empty.

3. The method of claim 1, wherein the multiplexing mode between the first signal and the second signal comprises at least one of the following:
   the first signal and the second signal being transmitted on a channel where the second signal is located;
   the first signal and the second signal sharing one cyclic redundancy check (CRC) information; or
   information included in the first signal and information included in the second signal being placed in an information block before channel coding for joint channel coding.

4. The method of claim 1, wherein, determining the transmission mode of the first signal according to the relationship information between the DCI corresponding to the first signal and the DCI corresponding to the second signal comprises:
   combining the first signal and the second signal into one channel for transmission when the DCI corresponding to the first signal and the DCI corresponding to the second signal belong to a same DCI group;
   not combining the first signal and the second signal into one channel for transmission when the DCI corresponding to the first signal and the DCI corresponding to the second signal belong to different DCI groups; and
   transmitting the first signal and the second signal respectively in their own channels when the DCI corresponding to the first signal and the DCI corresponding to the second signal belong to different DCI groups.

5. A device for signal transmission based on a relationship between a first signal and a second signal, comprising:
   determining a transmission mode of the first signal according to the following:
   a relationship information between a downlink control information (DCI) corresponding to the first signal and a downlink control information corresponding to the second signal, wherein the first signal and the second signal comprise uplink control information; and
   sending or receiving the first signal using the determined transmission mode;
   wherein the determined transmission mode comprises a multiplexing mode between the first signal and the second signal.

6. The device of claim 5, wherein, the processor is configured to read the signal transmission program to perform the following operations of:
   combining the first signal and the second signal into one channel for transmission when the DCI corresponding to the first signal and the DCI corresponding to the second signal belong to a same DCI group;
   not combining the first signal and the second signal into one channel for transmission when the DCI corresponding to the first signal and the DCI corresponding to the second signal belong to different DCI groups; and
   transmitting the first signal and the second signal respectively in their own channels when the DCI corresponding to the first signal and the DCI corresponding to the second signal belong to different DCI groups.

7. The method of claim 1, wherein the first signal and the second signal satisfy:
a control signaling for triggering a transmission of the first signal being prior to a control signaling for triggering a transmission of the second signal.

8. The method of claim 1, wherein the first signal and the second signal satisfy:
a priority of the first signal being higher than a priority of the second signal.

9. The method of claim 1, further comprising:
determining the transmission mode of the first signal according to a relationship information between the first signal and the second signal; wherein
the relationship information between the first signal and the second signal comprises whether the first signal and the second signal belonging to a same set of signals; or
the relationship information between the first signal and the second signal is determined based on a first signaling information comprising a group information of the first signal and the second signal, wherein the first signaling information is transmitted or received.

10. The method of claim 1, further comprising:
obtaining a spatial filtering parameter information of the first signal according to a second reference signal associated with the second signal;
wherein a spatial filtering parameter comprises one of: a beam parameter, a channel characteristic parameter, or a quasi-co-location (QCL) reference signal;
wherein the first signal comprises a signal on a data channel, and the second signal comprises one of a signal on a data channel, or a signal on a control channel.

11. The method of claim 4, wherein
a DCI group to which a DCI belongs is determined by a control channel resource set (CORESET) of the DCI, wherein the DCI comprises the DCI corresponding to the first signal and the DCI corresponding to the second signal.

12. The method of claim 1, wherein the multiplexing mode between the first signal and the second signal comprises at least one of the following:
the first signal being transmitted on a channel where the first signal is located, and the second signal being transmitted on a channel where the second signal is located;
each of the first signal and the second signal has its own independent CRC information; or
information included in the first signal and information included in the second signal being placed in two independent information blocks before channel coding for independent channel coding.

13. The device of claim 5, wherein the first signal and the second signal satisfy:
a transmission direction of the first signal being the same as a transmission direction of the second signal;
the first signal and the second signal being transmitted within a time unit; and
an intersection of resources occupied by the first signal and resources occupied by the second signal in time domain is not empty.

14. The device of claim 5, wherein the first signal and the second signal satisfy:
a control signaling for triggering a transmission of the first signal being prior to a control signaling for triggering a transmission of the second signal.

15. The device of claim 5, wherein the first signal and the second signal satisfy:
a priority of the first signal being higher than a priority of the second signal.

16. The device of claim 5, wherein, the processor is configured to read the signal transmission program to perform the following operations of:
determining the transmission mode of the first signal according to a relationship information between the first signal and the second signal; wherein
the relationship information between the first signal and the second signal comprises whether the first signal and the second signal belonging to a same set of signals; or
the relationship information between the first signal and the second signal is determined based on a first signaling information comprising a group information of the first signal and the second signal, wherein the first signaling information is transmitted or received.

17. The device of claim 5, wherein, the processor is configured to read the signal transmission program to perform the following operations of:
obtaining a spatial filtering parameter information of the first signal according to a second reference signal associated with the second signal;
wherein a spatial filtering parameter comprises one of: a beam parameter, a channel characteristic parameter, or a quasi-co-location (QCL) reference signal;
wherein the first signal comprises a signal on a data channel, and the second signal comprises one of a signal on a data channel, or a signal on a control channel.

18. The device of claim 16, wherein
a DCI group to which a DCI belongs is determined by a control channel resource set (CORESET) of the DCI, wherein the DCI comprises the DCI corresponding to the first signal and the DCI corresponding to the second signal.

19. The device of claim 5, wherein the multiplexing mode between the first signal and the second signal comprises at least one of the following:
the first signal and the second signal being transmitted on a channel where the second signal is located;
the first signal and the second signal sharing one cyclic redundancy check (CRC) information; or
information included in the first signal and information included in the second signal being placed in an information block before channel coding for joint channel coding.

20. The device of claim 5, wherein the multiplexing mode between the first signal and the second signal comprises at least one of the following:
the first signal being transmitted on a channel where the first signal is located, and the second signal being transmitted on a channel where the second signal is located;
each of the first signal and the second signal has its own independent CRC information; or
information included in the first signal and information included in the second signal being placed in two independent information blocks before channel coding for independent channel coding.

* * * * *

UNITED STATES PATENT AND TRADEMARK OFFICE
CERTIFICATE OF CORRECTION

PATENT NO. : 11,382,096 B2
APPLICATION NO. : 16/833591
DATED : July 5, 2022
INVENTOR(S) : Shujuan Zhang et al.

It is certified that error appears in the above-identified patent and that said Letters Patent is hereby corrected as shown below:

In the Specification

Column 9, Lines 33-34, "filtering parameter and etc as describe above.", should read -filtering parameter, etc., as described above.-.

In the Claims

Column 27, Lines 57-58, "and a downlink control information corresponding to", should read -and a DCI corresponding to-.

Column 28, Line 39, after "comprising:" insert, -a storage for storing a signal transmission program; a processor, configured to read the signal transmission program to perform the following operations of:-.

Column 28, Line 44, "downlink control information", should read -DCI-.

Signed and Sealed this
Twenty-third Day of January, 2024

Katherine Kelly Vidal
*Director of the United States Patent and Trademark Office*